(12) United States Patent
Shmaya et al.

(10) Patent No.: US 11,055,439 B2
(45) Date of Patent: Jul. 6, 2021

(54) CONFIRMATION MESSAGE DETERMINATIONS

(71) Applicant: ENTIT SOFTWARE LLC, Sanford, NC (US)

(72) Inventors: Daniel Shmaya, Yehud (IL); Eliraz Busi, Yehud (IL); Itay Ben-Yehuda, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 266 days.

(21) Appl. No.: 16/070,008

(22) PCT Filed: Jan. 25, 2016

(86) PCT No.: PCT/US2016/014749
§ 371 (c)(1),
(2) Date: Jul. 13, 2018

(87) PCT Pub. No.: WO2017/131617
PCT Pub. Date: Aug. 3, 2017

(65) Prior Publication Data
US 2019/0018971 A1    Jan. 17, 2019

(51) Int. Cl.
*G06F 7/04*       (2006.01)
*G06F 21/62*      (2013.01)
(Continued)

(52) U.S. Cl.
CPC .......... *G06F 21/629* (2013.01); *G06F 3/0481* (2013.01); *G06F 21/00* (2013.01);
(Continued)

(58) Field of Classification Search
CPC ...... G06F 21/629; G06F 3/0481; G06F 21/00; H04L 12/22; H04L 63/10
See application file for complete search history.

(56) References Cited

U.S. PATENT DOCUMENTS

| 6,282,649 B1 | 8/2001 | Lambert |
| 6,345,318 B1 | 2/2002 | Gamon |

(Continued)

FOREIGN PATENT DOCUMENTS

EP    0447339 A2    9/1991

OTHER PUBLICATIONS

Hoffman, C., 10 Windows Annoyances You Could Rid Yourself of Right Now, Mar. 1, 2013, Markuseof, 10 pages.
(Continued)

*Primary Examiner* — Darshan I Dhruv (57) ABSTRACT

An example technique involves sending, from a user device associated with a particular user, a request for a confirmation message setting. The request may include an indication of an identity of the particular user. The example technique involves determining that an operation included in a predetermined set of operations has been cued. The example technique involves receiving a response comprising an indication of a confirmation message setting for the cued operation prior to performing the cued operation. The confirmation message setting may be based on data generated responsive to the sent request. The confirmation message setting for the cued operation may include an indication of whether or not to output a confirmation message. The example technique involves determining, based on the received response, whether to prompt the particular user via a user interface of the user device for a response to a confirmation message prior to performing the cued operation.

18 Claims, 3 Drawing Sheets

(51) Int. Cl.
*H04N 7/16* (2011.01)
*H04L 12/22* (2006.01)
*G06F 3/0481* (2013.01)
*G06F 21/00* (2013.01)
*H04L 29/06* (2006.01)

(52) U.S. Cl.
CPC .......... *G06F 21/6209* (2013.01); *H04L 12/22* (2013.01); *H04L 63/10* (2013.01)

(56) References Cited

U.S. PATENT DOCUMENTS

| | | | | |
|---|---|---|---|---|
| 7,904,557 | B1* | 3/2011 | Van Riel | G06F 21/6218 709/225 |
| 9,106,691 | B1* | 8/2015 | Burger | H04L 63/1483 |
| 9,135,612 | B1* | 9/2015 | Proctor, Jr. | G06Q 20/3278 |
| 2002/0100035 | A1* | 7/2002 | Kenyon | G06F 8/65 717/168 |
| 2003/0084439 | A1* | 5/2003 | Perkins | H04L 29/06 717/177 |
| 2010/0169394 | A1 | 7/2010 | Hahn | |
| 2010/0325159 | A1* | 12/2010 | Wright | H04L 63/102 707/783 |
| 2011/0302211 | A1* | 12/2011 | Kilday | G06F 21/6218 707/785 |
| 2012/0209649 | A1* | 8/2012 | Ovenden | G06Q 10/0633 705/7.15 |
| 2012/0266239 | A1 | 10/2012 | Bradley, II | |
| 2013/0205215 | A1* | 8/2013 | Dunn | G06Q 50/01 715/738 |
| 2014/0074999 | A1 | 3/2014 | Khalsa et al. | |
| 2014/0157121 | A1* | 6/2014 | Jiang | G06F 21/34 715/702 |
| 2015/0121475 | A1* | 4/2015 | Cashman | H04L 63/126 726/4 |
| 2015/0279198 | A1* | 10/2015 | Gu | G08B 25/08 340/541 |
| 2015/0332062 | A1* | 11/2015 | McReynolds | H04L 51/32 726/28 |
| 2015/0358331 | A1* | 12/2015 | Rachalwar | H04L 63/102 726/7 |
| 2016/0191534 | A1* | 6/2016 | Mallozzi | G06F 21/629 726/4 |
| 2016/0306803 | A1* | 10/2016 | Jiang | G06F 16/285 |
| 2017/0140174 | A1* | 5/2017 | Lacey | G06F 21/6245 |
| 2017/0359379 | A1* | 12/2017 | Elliot | H04L 63/08 |

OTHER PUBLICATIONS

International Searching Authority., International Search Report and Written Opinion dated Oct 10, 2016 for PCT Application No. PCT/US2016/014749 Filed Jan. 25, 2016, 10 pages.
Mill, T., Advanced Notification: Per User, Per Project Configurable Schedule, Event Filter and Notification Format, Apr. 28, 2011, Redmine, Feature #8241, 5 pages.
Nield, D., Use Android's Priority Mode So Notifications Don't Wake You Up at Night, Jan. 22, 2015, Field Guide, 8 pages.

\* cited by examiner

CONFIRMATION MESSAGE DETERMINATIONS

BACKGROUND

User computing devices provide a computing platform for a variety of applications. Many applications are configured to seek confirmation from a user before executing a set of predetermined operations. For example, operations that access sensitive data and/or edit important data may be deemed high-risk. Prior to performing such an operation, the application may prompt the user for confirmation via the user interface of the device. For instance, the application may generate a pop-up message that prompts the user to confirm whether to proceed with execution of the operation. The user may then respond to the prompt, and, depending on their response, the device may either proceed with the operation or not. These prompts, which are also referred to herein as confirmation messages, may help prevent a user from accidentally executing those predetermined high-risk operations.

BRIEF DESCRIPTION OF THE DRAWINGS

The following detailed description references the drawings, wherein.

DETAILED DESCRIPTION

The following description makes reference to the accompanying drawings, in which similar symbols identify similar components, unless context dictates otherwise. The descriptions herein, as well as the drawings, present examples of the subject matter of the present disclosure and are in no way limiting in regard to the subject matter disclosed herein. Throughout the description, the singular forms of "a", "an", and "the" mean "one or more". Thus, various examples in which a component is described in singular form also apply to examples having multiple of those components. Moreover, some aspects of the examples presented herein may be modified, re-arranged, re-ordered substituted, combined, and/or separated in a variety of different configurations without departing from the subject matter of the present disclosure.

The present disclosure presents a technique for determining whether confirmation messages should be displayed for a particular user based in part on that user's group association. In some examples, a given users group association(s) may be specified by that user's role within an organization. Thus, the present disclosure involves managing confirmation messages for multiple users. A remote server may store data that indicates a set of operations for each of the multiple users. Then, prior to execution of a given operation on a given user device, the device consults the data stored on the remote server and determines whether or not to display a confirmation message for that operation depending on whether the given operation is amongst the set of operations specified for that user. In some cases, the data stored on the remote server for a given user may be periodically moved to local storage on that user's device such that real time confirmation message determinations may be made using data stored locally on the device itself.

In some examples, the multiple users may be affiliated with groups that divide users according to their respective degrees of tolerance to display of confirmation messages. For example, for an application used to develop other applications, some users may be developers, others admins, and others viewers. Developers may be more interested than other users in viewing confirmation messages so as to ensure that nothing important escapes their notice. Other groups, by contrast, may be relatively uninterested in viewing confirmation messages. In another example, users of mobile devices may self-identify according to their relative risk tolerance, e.g., high-risk, medium-risk, and low-risk.

For a given application, users having a common role or group association are likely to have similar preferences for the display (or non-display) of confirmation messages for a given operation. The present disclosure leverages this insight to generate default confirmation message settings for a given user based on that user's group association(s).

In some examples, a given user may request default confirmation message settings. The request may specify that user's group association(s). The remote server that maintains a list of confirmation message settings can then determine default settings for that particular user based on the preferences of other users having the same group association(s). For instance, the server may examine the confirmation message settings for each user having a common group association with the particular user (e.g., a common role), and develop default rules based on those preferences. In some examples, for each operation, the server may examine the preferences of all users having a common group association, and set the default setting for that operation based on the majority preference amongst those users.

Moreover, a user's preferences for display or non-display of a confirmation message may evolve over time based on a user's explicit and/or implicit inputs, and the list may be updated accordingly. For example, a menu may be available to allow a user to explicitly add operations to (or delete operations from) the set of operations for which a confirmation message is displayed. In some cases, a confirmation message may include an option to "not display this message again for this operation". In some cases, a user's repeated and/or quick dismissal of a confirmation message for a given operation may be interpreted as a preference to not show that confirmation any longer. The user's confirmation message settings may then be updated based on such feedback (e.g., by removing the operation from the set of operations for which a confirmation message is displayed).

Figure 1:
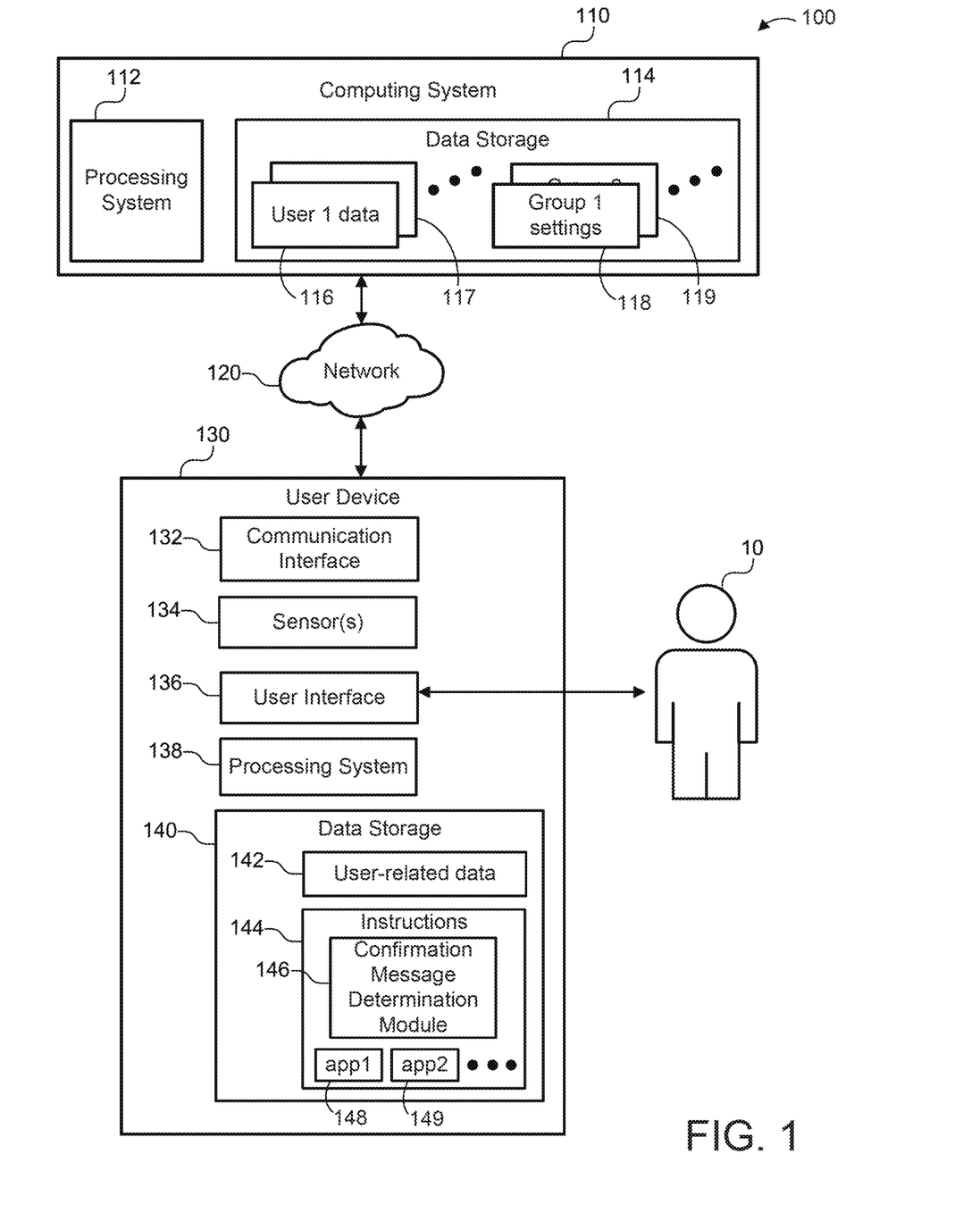
FIG. 1 is a block diagram of an example system for managing confirmation messages.

FIG. 1 is a block diagram of an example system 100 for managing confirmation messages. System 100 includes a user device 130 in communication with a computing system 110. The user device 130 and the computing system 110 may be communicatively coupled via network 120. In some cases, the computing system 110 may be a remote server and the user device 130 may be a network-connected computing device, such as a mobile computing device (e.g., cellular phone, tablet, etc.) or personal computer (e.g., laptop computer, computer terminal). As described herein, the user device 130 may use the computing system 110 to determine whether to display a confirmation message prior to performance of particular operations.

The computing system 110 includes a processing system 112 and data storage 114. The processing system 112 and data storage 114 may be communicatively coupled via a bus and/or network. The processing system 112 may include processor(s) that are used to execute instructions in the data storage 114. In some examples, the processing system 112 may include functional modules that perform predetermined tasks and/or routines. For example, functional modules may be defined by processor-executable instructions stored in memory that define processes performed by the computing system 110 upon execution of such instructions by the processor(s). In some examples, computing system 110 may include hardware features to perform processes described herein, such as logical circuit(s), application specific integrated circuit(s), etc.

Data storage 114 may be any electronic, magnetic, optical, or other physical storage device that can be non-transiently encoded to store data. Data storage 114 stores data specifying confirmation message settings for each one of multiple users. For example, data 116 indicates confirmation message settings for a first user and data 117 indicates confirmation message settings for a second user. The data 116, 117 may indicate group(s) with which the users are affiliated. For example, the user confirmation message settings data (e.g., 116, 117) may indicate, for each user, an organizational role and/or group association(s). Data storage 114 may also store data specifying default confirmation message settings for difference groups. For example, data 118 indicates default confirmation message settings for a first group and data 119 indicates default confirmation message settings for a second group.

The default confirmation message settings for the first group may be at least partially derived from the confirmation message settings of users affiliated with the first group. Similarly, the default confirmation message settings for the second group may be at least partially derived from the confirmation message settings of users affiliated with the second group. In some cases, the default confirmation message settings may be set to cause display of a confirmation message for a given operation if a threshold number (or percentage) of group-affiliated users display a confirmation message for the given operation. For instance, for a given group, the default settings may be set to the majority settings amongst the users within that group on an operation-by-operation basis.

The user device 130 may be a computing device that corresponds to a particular user 10. The user-associated computing device 130 may be, for example, a cellular phone and/or personal computer that is used by the user 10. In some examples, the description of the user device 130 may apply to devices that are used by multiple users that each have a separate login. The separate logins thereby provide separate implementations of a shared device in which personalized features, permissions, access rights, etc., are set according to attributes associated with each user. Thus, as described herein, upon user 10 logging in to such a shared device, that device corresponds to user 10 and may function in a way that is suitable for user 10 (e.g., according to attributes associated with user 10).

The user device 130 includes a communication interface 132, sensor(s) 134, a user interface 136, a processing system 138 and data storage 140. The communication interface 132 may include features that allow the computing device 130 to send and receive information via network 120 (e.g., for communication with computing system 110). For example, communication interface 132 may include an antenna for sending/receiving wireless signals and/or port(s) for wired network signals as well as related signal processing hardware for generating and interpreting such signals.

Sensor(s) 134 may include devices that generate data indicative of stimuli and/or status related to the context of the user device 130. In some examples, the sensor(s) 134 may include devices that generate data related to position, location, and/or acceleration of the device 130. In some examples, the sensor(s) 134 may include ambient temperature, incident sound, incident light, applied pressure, and/or touch of the device 130. Moreover, in some examples, the user device 130 may not include sensor(s) 134.

The user interface 136 may include a display device, an audio system, a haptic feedback system, or another system that allows the user 10 to perceive information. In some examples, the user interface 136 may convey information 230 via the user interface 136 (e.g., via a display device and/or audio system). Moreover, user interface 136 may include an input device, such as a touch-sensitive region, a microphone, an image capture device, etc., for receiving inputs from user 10. Thus, the user interface 136 allows the user 10 to operate the device 130 by providing inputs and receiving outputs. Among other features, the user interface 136 may be used to output confirmation messages for perception by the user 10. Such confirmation messages may prompt the user to indicate (via the user interface 10) whether to proceed with a given operation. In some examples, the user interface 136 may include a display device and the confirmation messages may be a pop-up window that is displayed in place of at least a portion of previously-displayed content—the pop-up window may appear to appear "over" the previously-displayed content. Other aspects of the user interface 136 may be used to prompt a user to respond to a confirmation message (i.e., to grant or deny permission for execution of a requested operation).

The processing system 138 may include processor(s) that are used to execute instructions in the data storage 140. In some examples, the processing system 138 may include functional modules that perform predetermined tasks and/or routines. For example, functional modules may be defined by processor-executable instructions stored in memory that define processes performed by the device 130 upon execution of such instructions by the processor(s).

Data storage 140 may be any electronic, magnetic, optical, or other physical storage device that can be non-transiently encoded to store data. Data storage 140 may store user-related data 142, such as information related to the identity of user 10 (e.g., social security number, date of birth, etc.); financial information (e.g., account numbers, etc.); location information (e.g., GPS sensor data, etc.); and/or other information related to user 10. Data storage 140 may include processor-executable instructions 144 that cause the device 130 to perform operations upon execution of the instructions 144 by the processing system 138.

Instructions 144 may include an operating system (OS) and applications 148, 149. For example, the OS may be initiated upon initialization of the device 130 and may operate to manage computing resources of the device 130 and regulate operation of applications 148, 149. In some examples, each application installed on the device 130 (e.g., the first application 148, the second application 149, etc.) may specify a set of high-risk operations for which user confirmation should be sought. In some examples, the OS may specify a set of such operations. The set of high-risk operations may include, for example, operations that involve accessing user-related data 142 and/or data generated by sensor(s) 134. The set of high-risk operations may include, for example, operations that involve over-writing or deleting, data stored in data storage 140. However specified, the set of high-risk operations may be used to queue the confirmation message determination module 146. The confirmation message determination module 146 may be a functional module that is specified by executable instructions to cause the device 130 to perform the operations described herein. In some cases, the confirmation message determination module 146 is to make determinations on whether to display a confirmation message prompt prior to performance of a given operation.

In some examples, the confirmation message determination module 144 may be invoked prior to execution of any operations that are included in a predetermined set of operations. The predetermined set of operations may be, for example, a set that is defined by aspects of an operating system and/or application(s). The module 146 may then determine whether a confirmation message should be displayed based in part on information associated with the user 10. In some cases, the module 146 may cause the device 130 to communicate with the server 110 prior to making a determination. For example, the module 146 may query the server 110 for user data corresponding to user 10 (e.g., the first user data 116), and base the determination of whether to display a confirmation message on such data. In some cases, the device 130's local data storage 140 may include a copy of the data stored on server 110 for user 10. As such, the module 146 may base the determination of whether to display a confirmation message on such data. In other cases, the confirmation message determination module 146 may first determine whether to refresh its local copy of data for user 10 from the server 110 prior to making the determination of whether to display a confirmation message. Such a refresh determination may be made based on the recency of the local copy as compared to the server-stored copy, for example.

In response to a determination made by the module 146, the device 130 either proceeds with performing the subject operation or prompts the user 10 with a confirmation message via the user interface 136 without performing the subject operation. The device 130 may then proceed with the operation only if a suitable response is received via the user interface 136 indicating that the user 10 approves of performance of the operation. The confirmation message determination module 146 may be implemented by instructions that form a part of other applications (e.g., applications 148, 149), by instructions that are part of an OS of the device 130, and/or by instructions that define a separate stand-alone application.

Figure 2:
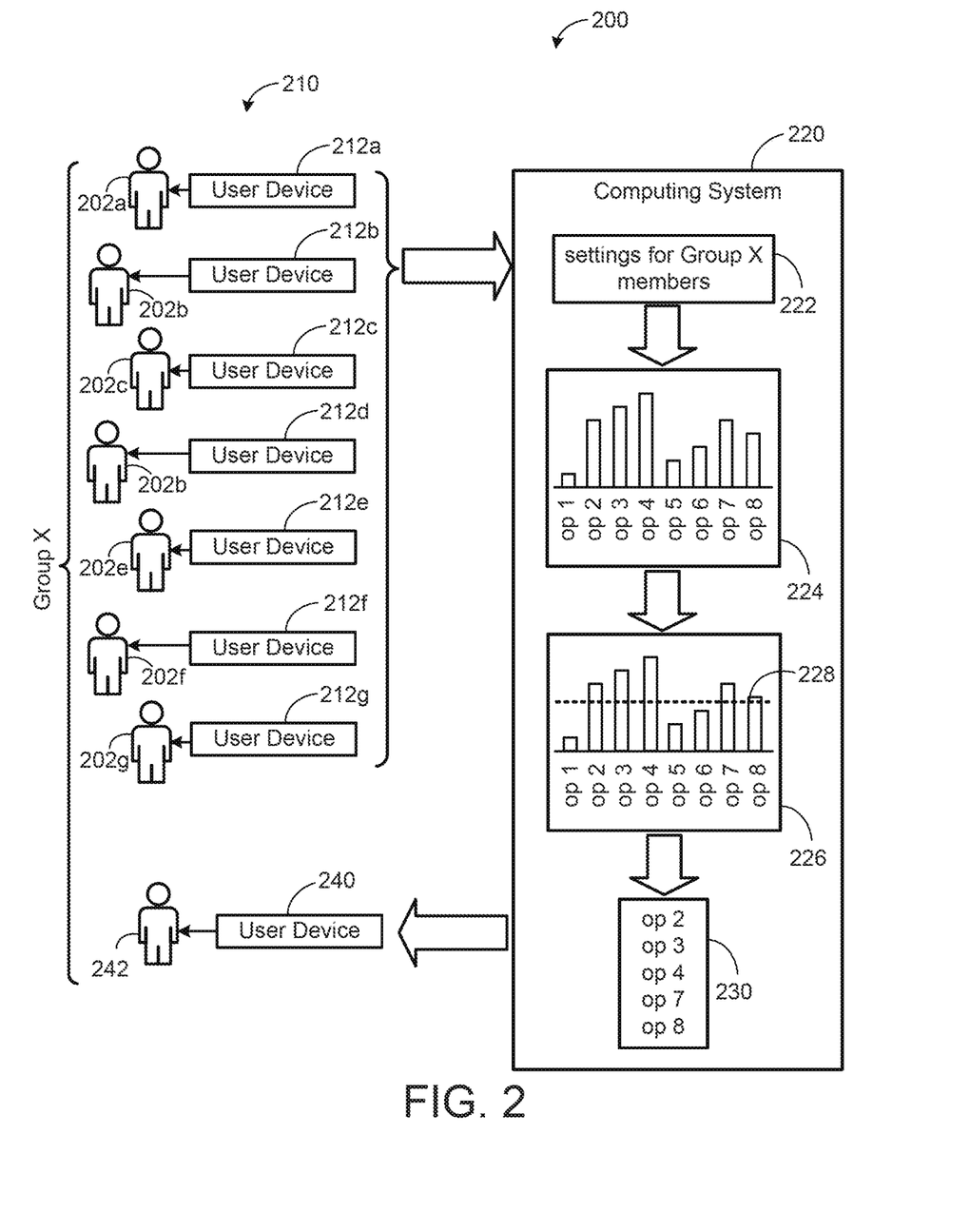
FIG. 2 is a block diagram of an example system in which devices are associated with groups and those groups are used to set confirmation message settings.

FIG. 2 is a block diagram of an example system 200 in which devices are associated with groups and those groups are used to set confirmation message settings. System 200 includes a group of user devices 210 and a computing system 220. The group of user devices 210 is labeled "Group X" in FIG. 2. Group X includes multiple user devices each of which are associated with a respective user, which are indicated by arrows in FIG. 2. Thus, device 212a is associated with user 202a; device 212b is associated with user 202b; device 212c is associated with user 202c; device 212d is associated with user 202d; device 212e is associated with user 202e; device 212f is associated with user 202f; device 212g is associated with user 202g; and device 240 is associated with user 242. Each of the user devices in Group X may provide functionality similar to that of the user device 130 described in connection with FIG. 1. In addition, the computing system 220 may provide functionality similar to that of the computing system 110 described in connection with FIG. 1. For instance, the user devices in Group X may communicate with the computing system 220 via a network connection, for example, and the computing system 220 may regulate and manage confirmation message settings for the user devices in Group X.

In some examples, membership in Group X may be defined based on a common or similar user type and/or role of each of the users in Group X. For instance, all users included in Group X may have a common hierarchical role within an organization and/or a common security access or permission level. In some examples, membership in Group X may be at least partially defined based on common or similar self-selected attributes of each of the users. For instance, all users in Group X may have selected a common risk level preference or have other self-selected user profile attributes in common. In some examples, the membership of Group X may be established (e.g., by a system administrator) such that users within the group generally have similar preferences regarding being prompted with confirmation messages prior to execution of certain operations. Thus, factor(s) which define the membership of Group X may be considered proxies for confirmation message preferences.

Computing system 220 is depicted with pictographs 222, 224, 226, 230 that represent stages of the system 220 generating a confirmation message setting for user device 240. For instance, the system 220 may generate such a confirmation message setting in response to a request from user device 240. In the example shown in FIG. 2, initially the computing system 220 may have confirmation message settings stored thereon for user devices 212a-g, but not for user device 240. The confirmation message settings for the user devices 212a-g can then be used to generate a confirmation message setting for user device 240.

For example, the user device 240 may send a request to the computing system 220 for confirmation message settings. The request may specify a group with which the user device 240 (and user 242) are associated (i.e., Group X). In some cases, the request may include an identity of user 242 and the computing system 220 may then determine the group with which user 242 is associated (i.e., Group X). For instance, the computing system 220 may store membership information for Group X such that users can be associated with groups at the computing system 220 based solely on the identity of the user.

Upon determining that user device 240 is associated with Group X, the computing system 220 may identify data 222 indicating confirmation message settings for members of Group X already stored by the computing system. For example, the data 222 may indicate, for each of the user devices 212a-g, whether or not to provide a confirmation message prior to performance of eight different operations. For clarity, an example dataset of such confirmation message settings depicted in the pictographs 224, 226 is shown below in Table 1. In some examples, the computing system 220 may also store confirmation message settings for a number of users that are not members of Group X and/or that are members of other groups.

TABLE 1

Example dataset of confirmation message settings

| User ID | Group | op 1 | op 2 | op 3 | op 4 | op 5 | op 6 | op 7 | op 8 |
|---------|-------|------|------|------|------|------|------|------|------|
| 202a | X | Y | N | Y | Y | N | Y | Y | Y |
| 202b | X | N | Y | Y | Y | Y | Y | Y | Y |
| 202c | X | N | Y | Y | Y | N | N | Y | N |
| 202d | X | N | N | N | Y | N | N | N | N |
| 202e | X | N | Y | Y | Y | N | N | N | N |

TABLE 1-continued

Example dataset of confirmation message settings

| User ID | Group | op 1 | op 2 | op 3 | op 4 | op 5 | op 6 | op 7 | op 8 |
|---|---|---|---|---|---|---|---|---|---|
| 202f | X | N | Y | Y | Y | Y | Y | Y | Y |
| 202g | X | N | Y | Y | Y | N | N | Y | Y |

In the example dataset shown in Table 1, each user (i.e., users 202a-g) is associated with a respective group (Group X for users 202a-g) and confirmation message settings for each of operations 1-8. For purposes of Table 1, the confirmation message settings are represented as "Y" to indicate that a confirmation message should be provided prior to performing a given operation and "N" to indicate that a confirmation message should not be provided prior to performing a given operation. In practice, there are a variety of data types and/or conventions that could be used to represent such information. For example, each user ID could simply be associated with a list of operations for which confirmation message should (or should not) be provided. The presence or absence of a given operation in such a list would thereby indicate whether or not to provide a confirmation message for that user. While table 1 is provided for example purposes, the present disclosure applies to examples in which the data 222 may indicate confirmation message settings according to a variety of conventions.

Referring again to Table 1, the table indicates that user 202a should have confirmation messages provided prior to performance of operations 1, 3, 4, 6, 7, but not operations 2 and 5. Thus, upon user device 212a determining that any of operations 1-8 have been cued, the device 212a may consult the confirmation message settings for user 202a and determine whether or not to prompt user 202a with a confirmation message. Such consultation may be carried out by communicating with computing system 220 to query the confirmation message setting for the subject operation or by referring to a locally stored copy of such settings on user device 212a.

In some cases, data 222 (e.g., as represented in Table 1) may initially be populated with default values for each user, or at least for the first user in a given group that stores data on computing system 220. In some cases, the default values may be set to display a confirmation message for all operations (e.g., "Y" for all operations). In some cases, the default values may be set according to inputs from a system administrator. Once the initial default value is set, at least for a first user in a given group, those values may evolve over time according to preferences of that user.

In some examples, each of the users 202a-g may provide explicit indications of their preferred confirmation message settings by interacting with a settings menu or similar interface on their corresponding user device 212a-g. Upon updating their settings, such information may then be communicated to computing system 220 and data 222 may be updated accordingly. In some cases, each time a user is prompted with a confirmation message, the prompt may allow the user to update their settings for that operation. For example, the user may be provided with an option to either: (a) proceed with the operation and do not provide confirmation messages prior to performance of that operation in the future; (b) proceed with the operation and continue to provide confirmation messages for that operation in the future; or (c) do not proceed with the operation and continue to provide confirmation messages for that operation in the future. If the user's response indicates that confirmation messages should no longer be provided for a given operation, then that information may be communicated to computing system 220 and data 222 may be updated to reflect the change.

Once data 222 is populated with user-customized data for the users 202a-g (e.g., the example dataset shown in Table 1), that data may be used to determine a new set of default settings for users in a given group. Thus, for user 242, who is a member of Group X, default confirmation message settings may be derived based at least in part on the confirmation message settings of users 202a-g. In doing so, the computing system 220 may combine the data 222 for all current members of Group X (i.e., settings for users 202a-g). Pictograph 224 depicts a bar graph of the number of "Y"s for each operation when the settings of users 202a-g are combined. As shown in pictograph 224, upon summing the "Y"s across each operation, there is: 1 for operation 1; 5 for operation 2; 6 for operation 3; 7 for operation 4; 2 for operation 5; 3 for operation 6; 5 for operation 7; and 4 for operation 8. Next, as depicted in pictograph 226, the combined numbers for each operation may be compared with a threshold 228 to identify the operations that should be included in the default settings. For example, threshold 228 may be set to 50% of the possible maximum value such that all the totals that exceed 3.5, exceed threshold 228 (Operations 2, 3, 4, 7, and 8). Pictograph 230 illustrates the subset of operations that exceed threshold 228, and are therefore included in the default settings. Alternative values for threshold 228 may also be used. For instance, the threshold may be set such that all operations with at least one count (e.g., one user with a setting of "Y") will exceed the threshold.

Upon generating the default settings (as depicted by pictograph 230), data 222 for storing confirmation message settings at the computing system 220 may be updated to reflect the addition of user 242, member of Group X, and with "Y" values for operations 2, 3, 4, 7, and 8. As noted above, indicators of such information may be stored at computing system 220 according to a number of different conventions. In addition, the default confirmation message settings 230, once generated, may be communicated to user device 240 to allow the device 240 to determine whether to provide a confirmation message or not prior to execution of any of operations 1-8. In operation, upon determining that any of operations 1-8 has been cued on user device 240, the device may then consult the confirmation message settings for user 242 (e.g., the settings 230) and determine, based on those settings, whether to prompt user 242 with a confirmation message prior to performing that operation. In some cases, this may involve communicating with computing system 220 to query the confirmation message settings for user 242 stored at the computing system 220; in some cases, this may involve referring to a copy of such settings stored locally on device 240.

Figure 3:
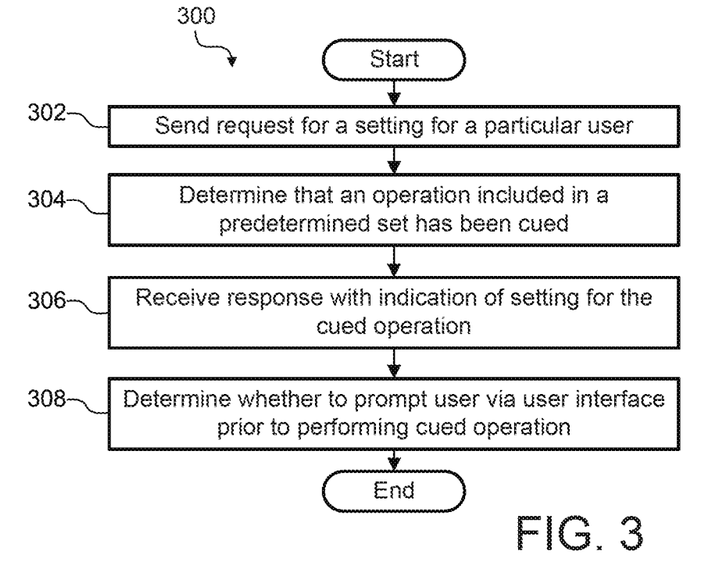
FIG. 3 is a flowchart of an example process for determining whether to output a confirmation message.

FIG. 3 is a flowchart of an example process 300 for determining whether to output a confirmation message. Process 300 may be described below as being executed or performed by a system, such as a user computing device (e.g., device 130 described in connection with FIG. 1). Process 300 may be implemented in the form of executable instructions stored on at least one machine-readable storage medium of the system and executed by at least one processor of the system. In some examples, process 300 may be implemented in the form of electronic circuitry (e.g., hardware). The process 300 is depicted with a series of blocks in the flowchart of FIG. 3. In some cases, one or more blocks of process 300 may be executed substantially concurrently or in a different order than shown in FIG. 3. In some cases, process 300 may include more or less blocks than are shown in FIG. 3. In some examples, one or more of the blocks of process 300 may, at certain times, be ongoing and/or may repeat.

At block 302, a device sends a request for a confirmation message setting for a particular user. For instance, device 130 may send a request to computing system 110 via network 120. The request may specify the particular user 10 that is associated with device 130.

At block 304, the device determines that an operation included in a predetermined set of operations has been cued. For example, device 130 may include a functional module that monitors operations that are performed on the device. As used herein, when a given operation is being prepared/scheduled to be executed, that operation is cued for subsequent performance. Prior to allowing any given operation to be performed, the module may compare the given operation to each operation in a predetermined set of operations. The predetermined set may include, for example, operations that involve accessing and/or modifying user-related data. If the module determines that the cued operation (i.e., the operation that is soon-to-be-performed) matches an operation in the predetermined set, then the module may temporarily halt execution of that operation until it can be determined whether to prompt the user with a confirmation message. Such functionality may be provided in a variety of different ways via processor-executable instructions installed on the device. Thus, the determination at block 304 may involve monitoring cued operations, and determining whether each cued operation is one that is included in a predetermined set of operations.

At block 306, the device receives a response with an indication of a confirmation message setting for the cued operation. The response is based on data that is generated in response to the request sent in block 302. For example, the request of block 302 may cause data storage of a remote server to become populated with data indicating confirmation message settings for one or more operations for the particular user. Such a remote server may or may not communicate such settings to the requesting device immediately. For instance, the settings, once stored at such a remote server, may be communicated to the requesting device (or another device associated with the same particular user) in response to a subsequent request from such device. Such a subsequent request may be made, for instance, upon the device determining, at block 304, that a cued operation matches one in the predetermined set of operations, at which point the device may send a request to the remote server for the confirmation message setting for that cued operation for that particular user. Moreover, in some cases, the confirmation message settings stored at a remote server, which are generated in response to the request of block 302, may be communicated back to the requesting device immediately, and perhaps even prior to the determination at block 304. Such an immediately communicated response may then be locally stored at the requesting device for future reference. Thus, the response received at block 306 may occur responsive to sending the request at block 302, and prior to block 304, or may occur following bock 304, in response to a subsequent request from the device (or another device associated with the particular user), or at another time. In any event, the response indicating the confirmation message setting for the cued operation for the particular user is based on data that is generated in response to the request sent in block 302 (e.g., data generated at a remote server).

At block 308, the device determines whether to prompt the user via a user interface of the device prior to performing the cued operation. The determination at block 308 is based at least partially on the response received in block 306. The response received in block 306 includes an indication of whether or not to prompt the user with a confirmation message for the cued operation. As noted herein, such indication may be provided according to a number of different conventions (e.g., a binary data value for that operation, inclusion or non-inclusion in a list of operations, etc.). If the response of block 306 indicates that the user should be prompted with a confirmation message for the cued operation, then the determination of block 308 is to prompt the user prior to performing the cued operation. Similarly, if the response of block 306 indicates that the user should not be prompted with a confirmation message for the cued operation, then the determination of block 308 is to not prompt the user prior to performing the cued operation.

If the determination of block 308 is made to prompt the user, then the process 300 may also include causing the device to output a prompt to the user via the device's user interface. The process 300 may also include receiving a response from the user, via the user interface, indicating whether or not the user approves of proceeding with the cued operation. Then, the process 300 may involve only allowing the device to perform the cued operation if the user's response indicates that the user approves of performing the cued operation. If the user's response indicates the user's disapproval, then the process 300 may include halting the cued operation and not allowing it to be performed.

Figure 4:
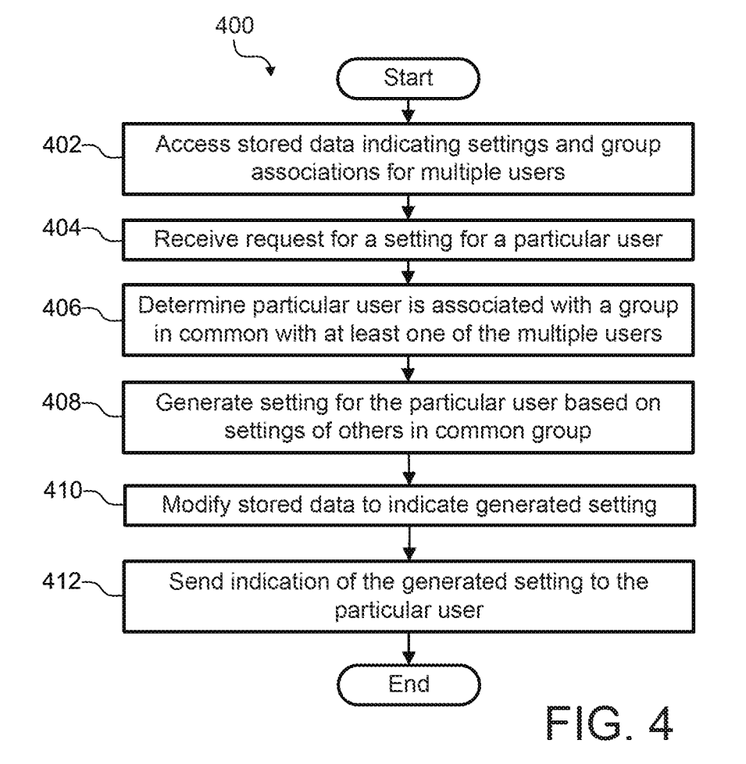
FIG. 4 is a flowchart of an example process for generating confirmation message settings based in part on group association.

On the other hand, if the determination of block. 308 is made to not prompt the user, then the process 300 may proceed with causing the device to perform the cued operation without first prompting the user with a confirmation message. As such, the entire process 300 may be transparent to the user, because the cued operation will simply be performed without an additional prompt or other interaction that would be perceptible to the user, FIG. 4 is a flowchart of an example process 400 for setting confirmation message settings based in part on group association. Process 400 may be described below as being executed or performed by a system, such as a remote computing system. Process 400 may be implemented in the form of executable instructions stored on at least one machine-readable storage medium of the system and executed by at least one processor of the system. In some examples, process 400 may be implemented in the form of electronic circuitry (e.g., hardware). The process 300 is depicted with a series of blocks in the flowchart of FIG. 4. In some cases, one or more blocks of process 400 may be executed substantially concurrently or in a different order than shown in FIG. 4. In some cases, process 400 may include more or less blocks than are shown in FIG. 4. In some examples, one or more of the blocks of process 300 may, at certain times, be ongoing and/or may repeat.

At block 402, a computing system accesses stored data indicating confirmation message settings and group associations for multiple users. For example, a remote server (or combination of servers) may include a dataset that associates each one of multiple users with a group and with confirmation message settings for one or more operations. As noted herein, such a dataset may be implemented according to number of different conventions. As an example, the computing system 220 stores data 222 indicating confirmation message settings for members of Group X. Moreover, in some examples, the data may be stored via a third party service and accessed by the computing system 220.

At block 404, a request is received for a confirmation message setting for a particular user. The particular user may be indicated using a unique identifier, such as a registration number or the like. The request of block 404 indicates that a new set of confirmation message settings should be generated for that particular user. The particular user may or may not be one for which data is already stored in the dataset of referenced in block 402. If the particular user is not among those for which data is already stored, then the process 400 will involve generating new confirmation message settings and supplementing the dataset stored in block 402. If the particular user is among those for which data is already stored, then the process 400 will involve generating new confirmation message settings and over-writing the corresponding entries of the previously stored data to reflect the new settings.

At block 406, the computing system may reference the stored data indicating confirmation message settings for multiple users and determine that the particular user is associated with a group in common with at least one of the multiple users. For instance, the computing system may first identify a group with which the particular user is associated. In some cases, associated group information may be included in the request received in block 404 (i.e., from the user device). In some cases, the association group information for a given user may be derived at the computing system by reference to a group membership database. For example, groups may be defined based on user's roles within an organization, and the computing system may reference an organizational chart or job title database to associate a given user with their respective group. Once a group is identified for the particular user, the computing system may then search the stored data for users associated with the same group. Upon identifying at least one other user in the stored data that is associated with the same group, block 406 is complete.

At block 408, the computing system generates confirmation message settings for the particular user based on settings of others in the common group (identified in block 406). For example, the computing system may perform a process similar to that described in connection with FIG. 2 in which the settings of Group X members already stored in data 222 were used to generate settings for user 240 who was also a member of Group X. Thus, the computing system may combine together the settings of all members of the common group (excluding the particular user) and adopt the majority settings on an operation-by-operation basis to be those of the particular user.

In some cases, alternative approaches may be adopted for using the settings of the users in the common group as a basis for generating the settings of the particular user. For example, for a given operation, the number of group members with a setting indicating that the user should be prompted with a confirmation message may be compared with a threshold. For any operation with a corresponding number that exceeds the threshold, the setting for that operation may be set to indicate that the user should be prompted with a confirmation message. And similarly, for any operation with a corresponding number that does not exceed the threshold, the setting for that operation may be set to indicate that the user should not be prompted with a confirmation message. The threshold may be set at about 50% of the total number of members in the group, such that the majority setting for each operation becomes adopted by the particular user. Of course, the threshold may be set to a range of different values between 0 and the total number of members in the group. Equivalently, the raw numbers may be converted to a ratio or percentage of the total number of members in the group, and the threshold may be a value between 0 and 1. In some instances, adjusting the threshold may be a reflection of the risk tolerance of the particular user.

At block 410, the computing system modifies the stored data to indicate the generated settings for the particular user. For example, the data 222 may be supplemented and/or overwritten as necessary to reflect the newly generated settings for the particular user of block 408.

At block 412, the computing system sends an indication of the generated setting to the particular user. In some examples, the indication sent in block 412 may be a response to the request received in block 404. In some examples, the indication sent in block 412 may be a response to a subsequently received request. For example, subsequent to sending the request in block 404, a device associated with the same particular user may determine that a given operation has been cued. At that time, such device may send a request for the confirmation message setting for such cued operation. Upon receiving such subsequent request, the computing system may then send a response that indicates (at least) the confirmation message setting for the cued operation for the particular user.

In the case that none of the other multiple users represented in the stored data are associated with the same group (i.e., block 406 fails), then the computing system may revert to default confirmation message settings. The default confirmation message settings may be set by a system administrator and/or may default to causing a confirmation message to be output for all operations in the predetermined set. In some cases, moreover, the process 400 may also involve determining whether the numbers of members in the common group exceeds a threshold prior to generating settings for the particular user based on the settings of those group members. For example, if there are less than 3 members, the computing system may simply generate the default settings for the particular user, regardless of the settings of the other members of the common group.

The invention claimed is:

1. A method comprising:
sending, from a user device associated with a particular user, a request for a setting of a confirmation message, wherein the sent request further comprises an indication of a group with which the particular user is associated, the group comprising multiple users having similar preferences for display or non-display of confirmation messages for a given user-requested operation, wherein the request comprises an indication of an identity of the particular user, and wherein the confirmation message prompts a user to confirm whether to proceed with performance of a user-requested operation on the user device;
determining, by the user device, that a given user-requested operation on the user device included in a predetermined set of operations has been cued;
prior to performing the cued given user-requested operation, receiving, by the user device, a response comprising an indication of a confirmation message setting for the cued given user-requested operation, wherein the confirmation message setting is based on data generated responsive to the sent request, wherein a confirmation message setting for the particular user is based on confirmation message settings for plural other users in the group, and wherein the confirmation message setting for the cued given user-requested operation comprises an indication of whether or not to output a confirmation message; and based on the received response, determining, by the user device, whether to prompt the particular user via a user interface of the user device for a response to a selected confirmation message prior to performing the cued given user-requested operation.

2. The method of claim 1, wherein the sent request causes a computing system to generate a confirmation message setting for the cued given user-requested operation for the particular user based at least in part on confirmation message settings for the cued given user-requested operation of one or more other users associated with the group with which the particular user is also associated.

3. The method of claim 1, wherein each operation in the predetermined set of operations is a high-risk operation for which user confirmation should be sought and further comprising:

after determining that the given user-requested operation included in the predetermined set of operations has been cued, sending a second request for a confirmation message setting for the cued given user-requested operation, and wherein the response is received in response to sending the second request.

4. The method of claim 1, wherein each operation in the predetermined set of operations is a high-risk operation for which user confirmation should be sought, wherein the predetermined set of operations excludes a second set of operations comprising low-risk operations for which user confirmation should not be sought, and wherein the response is received prior to determining that the given user-requested operation included in the predetermined set of operations has been cued.

5. The method of claim 1, wherein determining that the given user-requested operation included in the predetermined set of operations has been cued comprises:

prior to performing the given user-requested operation, comparing the given user-requested operation with operations included in the predetermined set of operations;

determining that the given user-requested operation matches an operation in the predetermined set of operations; and responsive to determining that the given user-requested operation matches, halting execution of the given user-requested operation.

6. The method of claim 1, wherein the sent request further comprises an indication of the group with which the particular user is associated, the group comprising multiple users having similar preferences for display or non-display of confirmation messages for a given user-requested operation, wherein the multiple users in the group have a common or similar user type and/or role, and wherein the confirmation message setting for the cued given user-requested operation comprises an indication to not display a confirmation message, the method further comprising:

without first prompting the particular user via the user interface, causing the user device to perform the cued given user-requested operation.

7. The method of claim 1, wherein the confirmation message setting for the cued given user-requested operation comprises an indication to display a confirmation message, the method further comprising:

prior to performing the cued given user-requested operation, causing the user device to prompt the particular user via the user interface for a response to a confirmation message;

receiving a response to the confirmation message via the user interface; and only causing the user device to perform the cued given user-requested operation when the received response to the confirmation message indicates the particular user approves of performance of the cued given user-requested operation and otherwise causing the user device to not perform the cued given user-requested operation.

8. A user device associated with a particular user, the user device comprising:

a user interface;

a communication interface;

a processing system; and data storage comprising computer readable instructions and coupled to the user interface, processing system, and communication interface, that, when executed, cause the processing system to:

send a request for a setting of a confirmation message, wherein the request comprises an indication of the particular user, wherein the confirmation message prompts the particular user to confirm whether to proceed with performance of a user-requested operation on the user device, and wherein the sent request further comprises an indication of a group with which the particular user is associated, the group comprising multiple users having similar preferences for display or non-display of confirmation messages for a given user-requested operation;

prior to performing a given user-requested operation on the user device, compare the given user-requested operation with a predetermined set of operations;

determine that the given user-requested operation matches an operation in the predetermined set of operations;

responsive to determining that the given user-requested operation matches, halt execution of the given user-requested operation;

prior to performing the given user-requested operation, receive, via the communication interface, a response comprising an indication of a confirmation message setting for the given user-requested operation for the particular user, wherein the confirmation message setting for the given user-requested operation is based on data generated responsive to the sent request, wherein a confirmation message setting for the particular user is based on confirmation message settings for plural other users in the group, and wherein the confirmation message setting for the given user-requested operation comprises an indication of whether or not to output a confirmation message; and based on the received response, determine whether to prompt the particular user via a user interface of the user device for a response to the confirmation message prior to performing the given user-requested operation.

9. The user device of claim 8, wherein the sent request causes a computing system to generate the confirmation message setting for the given user-requested operation for the particular user based at least in part on confirmation message settings for the given user-requested operation of multiple other users associated with the group with which the particular user is also associated, the particular user and the multiple other users having similar preferences for display or non-display of confirmation messages for the given user-requested operation.

10. The user device of claim 8, wherein each operation in the predetermined set of operations is a high-risk operation for which user confirmation should be sought and wherein the confirmation message setting for the given user-requested operation for the particular user comprises an indication to not display a confirmation message, the processing system to:

without first prompting the particular user via the user interface, cause the user device to perform the given user-requested operation.

11. The user device of claim 8, wherein each operation in the predetermined set of operations is a high-risk operation for which user confirmation should be sought, wherein the predetermined set of operations excludes a second set of operations comprising low-risk operations for which user confirmation should not be sought, and wherein the confirmation message setting for the given user-requested operation for the particular user comprises an indication to display a confirmation message, the processing system to:

prior to performing the given user-requested operation, cause the user device to prompt the particular user via the user interface for a response to a confirmation message;

receive a response to the confirmation message via the user interface; and only cause the user device to perform the given user-requested operation if the received response to the confirmation message indicates the particular user approves of performance of the given user-requested operation and otherwise cause the user device to not perform the given user-requested operation.

12. The method of claim 1, further comprising:

accessing stored data indicating, for each of multiple users, a confirmation message setting for a given user-requested operation and the group with which a selected user of the multiple users is associated;

determining that the particular user is associated with the group;

generating a confirmation message setting for the given user-requested operation for the particular user based on the confirmation message setting for the given user-requested operation of the selected user;

modifying the stored data to further indicate the generated confirmation message setting for the given user-requested operation and the group; and sending, to the user device associated with the particular user, an indication of the generated confirmation message setting for the given user-requested operation for the particular user.

13. The method of claim 12, wherein the confirmation message setting for the given user-requested operation indicates a confirm value or a non-confirm value, which corresponds to whether a confirmation message should be output prior to execution of the given user-requested operation or not, respectively, and wherein generating the confirmation message setting for the given user-requested operation for the particular user comprises:

computing at least one of a number of the at least one of the multiple users with a confirmation message setting indicating a confirm value or a number of the selected user with a confirmation message setting having a non-confirm value;

comparing a threshold with the computed at least one of the number of the at least one of the multiple users with a confirmation message setting indicating a confirm value or the number of the selected user with a confirmation message setting having a non-confirm value; and setting the confirmation message setting for the given user-requested operation for the particular user to indicate the confirm value when the at least one of the computed at least one of the number of the at least one of the multiple users with a confirmation message setting indicating a confirm value or the number of the selected user with a confirmation message setting having a non-confirm value exceeds the threshold or the non-confirm value when not.

14. The method of claim 12, wherein each of the multiple users is associated with a common group and wherein the common group is based on a respective user's role.

15. A method comprising:

sending, via a communication interface, a request for a setting of a confirmation message, wherein the sent request comprises an indication of a particular user, wherein the sent request further comprises an indication of a group with which the particular user is associated, the group comprising multiple users having similar preferences for display or non-display of confirmation messages for a given user-requested operation, wherein the multiple users in the group have a common or similar user type and/or role, and wherein the confirmation message prompts the particular user to confirm whether to proceed with performance of a user-requested operation on a user device;

prior to performing a given user-requested operation on the user device, comparing, by a processor, the given user-requested operation with a predetermined set of operations;

determining, by the processor, that the given user-requested operation matches an operation in the predetermined set of operations;

responsive to determining that the given user-requested operation matches an operation in the predetermined set of operations, halting, by the processor, execution of the given user-requested operation;

prior to performing the given user-requested operation, receiving, via the communication interface, a response comprising an indication of a confirmation message setting for the given user-requested operation for the particular user, wherein the confirmation message setting for the given user-requested operation for the particular user comprises an indication to not display a confirmation message, wherein the confirmation message setting for the given user-requested operation is based on data generated responsive to the sent request, and wherein the confirmation message setting for the given user-requested operation comprises an indication of whether or not to output a confirmation message;

based on the received response, determining, by the processor, whether to prompt the particular user via a user interface of the user device for a response to the confirmation message prior to performing the given user-requested operation; and without first prompting the particular user via the user interface, performing, by the processor, the given user-requested operation.

16. The method of claim 15, wherein each operation in the predetermined set of operations is a high-risk operation for which user confirmation should be sought, wherein the predetermined set of operations excludes a second set of operations comprising low-risk operations for which user confirmation should not be sought, and wherein the sent request causes a computing system to generate the confirmation message setting for the given user-requested operation for the particular user based at least in part on confirmation message settings for the given user-requested operation of one or more others users associated with the group with which the particular user is also associated.

17. The method of claim 15, wherein the sent request further comprises an indication of the group with which the particular user is associated, the group comprising multiple users having similar preferences for display or non-display of confirmation messages for a given user-requested operation, wherein the multiple users in the group have a common or similar user type and/or role, and wherein the confirmation message setting for the given user-requested operation for the particular user comprises an indication to display a confirmation message and further comprising:
  prior to performing the given user-requested operation, prompting, by the processor, the particular user via a user interface for a response to a confirmation message;
  receiving, by the processor, a response to the confirmation message via the user interface; and
  the processor only performing the given user-requested operation when the received response to the confimation message indicates the particular user approves of performance of the given user-requested operation and otherwise performing the given user-requested operation.

18. The method of claim 15, wherein each operation in the predetermined set of operations is a high-risk operation for which user confirmation should be sought, wherein the predetermined set of operations excludes a second set of operations comprising low-risk operations for which user confirmation should not be sought, and further comprising:
  accessing stored data indicating, for each of multiple users, a confirmation message setting for a given user-requested operation and a group with which a selected user of the multiple users is associated;
  determining that the particular user is associated with the group;
  generating a confirmation message setting for the given user-requested operation for the particular user based on the confirmation message setting for the given user-requested operation of the selected user;
  modifying the stored data to further indicate the generated confirmation message setting for the given user-requested operation and the group; and
  sending, to the user device associated with the particular user, an indication of the generated confirmation message setting for the given user-requested operation for the particular user.

* * * * *